United States Patent
Burke, Jr.

(10) Patent No.: US 8,505,004 B2
(45) Date of Patent: Aug. 6, 2013

(54) METHODS AND SYSTEMS FOR PROVIDING SOFTWARE UPDATES USING A CLOUD ADMINISTRATION SYSTEM

(75) Inventor: Robert William Burke, Jr., Stanley, NY (US)

(73) Assignee: Xerox Corporation, Norwalk, CT (US)

( * ) Notice: Subject to any disclaimer, the term of this patent is extended or adjusted under 35 U.S.C. 154(b) by 195 days.

(21) Appl. No.: 13/112,396

(22) Filed: May 20, 2011

(65) Prior Publication Data
US 2012/0297375 A1 Nov. 22, 2012

(51) Int. Cl.
*G06F 9/44* (2006.01)

(52) U.S. Cl.
USPC ........... 717/173; 717/170; 717/178; 358/1.15

(58) Field of Classification Search
USPC .......... 717/168–178; 709/220–222; 358/1.13, 358/1.15; 707/790–812
See application file for complete search history.

(56) References Cited

U.S. PATENT DOCUMENTS

| | | | |
|---|---|---|---|
| 5,305,199 A | 4/1994 | LoBiondo et al. | |
| 6,304,732 B1 | 10/2001 | Myers et al. | |
| 6,647,222 B1 | 11/2003 | Digby et al. | |
| 7,304,758 B2 * | 12/2007 | Ferlitsch | 358/1.15 |
| 7,317,882 B2 | 1/2008 | Dombrowski | |
| 7,430,736 B2 * | 9/2008 | Nguyen et al. | 717/176 |
| 7,574,496 B2 | 8/2009 | McCrory et al. | |
| 7,587,146 B2 | 9/2009 | Horn | |
| 7,649,638 B2 | 1/2010 | Beard et al. | |
| 7,650,085 B2 | 1/2010 | Kehoe et al. | |
| 7,667,874 B2 | 2/2010 | MacDonald et al. | |
| 7,773,239 B2 | 8/2010 | Beard et al. | |
| 1,004,720 A1 | 2/2011 | Mansoor et al. | |
| 7,913,246 B2 * | 3/2011 | Hammond et al. | 717/173 |
| 8,009,302 B2 | 8/2011 | Martin | |
| 8,139,238 B2 | 3/2012 | Oki | |
| 2002/0067504 A1 * | 6/2002 | Salgado et al. | 358/1.15 |
| 2003/0020948 A1 * | 1/2003 | Jarvis et al. | 358/1.15 |
| 2003/0149917 A1 * | 8/2003 | Smith et al. | 714/38 |
| 2004/0243994 A1 * | 12/2004 | Nasu | 717/171 |
| 2007/0234331 A1 * | 10/2007 | Schow et al. | 717/168 |
| 2009/0178033 A1 * | 7/2009 | Challener et al. | 717/168 |
| 2009/0235242 A1 * | 9/2009 | Kawaguchi | 717/168 |
| 2010/0103445 A1 | 4/2010 | Levine et al. | |

(Continued)

OTHER PUBLICATIONS

Kuo-Feng Ssu et al., Online Non-stop Software Update Using Replicated Execution Blocks, 2000, IEEE, pp. 319-324.*

(Continued)

*Primary Examiner* — Phillip H Nguyen
*Assistant Examiner* — Satish Rampuria
(74) *Attorney, Agent, or Firm* — Fox Rothschild LLP

(57) ABSTRACT

A cloud administration system for providing a software update to one or more remote print devices may include a processing module in communication with the submission module a plurality of print devices. The processing module may be located remotely from each print device. The cloud administration system may include a storage module in communication with the processing module. The storage module may be configured to receive a software update from an application computing device. The software update may include a software version. The processing module may be configured to receive the software update from the storage module, and transmit the software update to at least one of the plurality of print devices. The cloud administration system may operate as a shared resource for each print device and the application computing device.

8 Claims, 7 Drawing Sheets

U.S. PATENT DOCUMENTS

2010/0332629 A1    12/2010    Cotugno et al.
2011/0292431 A1    12/2011    Cok
2011/0292435 A1    12/2011    Cok et al.

OTHER PUBLICATIONS

Vandewoude, Yves, and Yolande Berbers, An overview and assessment of dynamic update methods for component-oriented embedded systems, Proceedings of The International Conference on Software Engineering Research and Practice. 2002, pp. 1-7.*

Michael Hicks, Dynamic Software Updating, ACM Transactions on Programming Languages and Systems, vol. 27, No. 6, Nov. 2005, pp. 1049-1096.*

B. Pellow, "Moving to the Cloud", Business Development Services Analysis, Nov. 2010, InfoTrends 2010, pp. 1-7.

A. Wawro, "Cloud Printers Rain on Security Parade", PC World, Apr. 2011, vol. 29, No. 4, p. 36.

* cited by examiner

METHODS AND SYSTEMS FOR PROVIDING SOFTWARE UPDATES USING A CLOUD ADMINISTRATION SYSTEM

CROSS-REFERENCE TO RELATED APPLICATIONS

This application is related to U.S. patent application Ser. Nos. 13/112,245, entitled "Method and System for Managing Print Jobs Using a Cloud Administration System", 13/112,303, entitled "Method and System for Managing Print Device Information Using a Cloud Administration System", 13/112,455, entitled "Methods and Systems for Tracking and Managing Print Device Inventory Information Using a Cloud Administration System", 13/112,552, entitled "Method and System for Managing Print Device Information Using a Cloud Administration System", and 13/112,625, entitled "Methods and Systems for Managing Print Device Licenses Using a Cloud Administration System", each filed on May 20, 2011 and each pending.

BACKGROUND

Typically, print-related services and solutions require providing onsite resources to a customer, such as software, hardware and personnel. In addition, numerous print-related services and solutions may operate autonomously, even though they utilize similar delivery mechanisms and backend connectivity. As such, providing print-related services can often be costly and inefficient. In particular, providing software updates to print devices may be time consuming and cost inefficient using conventional means.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a cloud administration system for providing a software update to one or more remote print devices may include a processing module in communication with the submission module a plurality of print devices. The processing module may be located remotely from each print device. The cloud administration system may include a storage module in communication with the processing module. The storage module may be configured to receive a software update from an application computing device. The software update may include a software version. The processing module may be configured to receive the software update from the storage module, and transmit the software update to at least one of the plurality of print devices. The cloud administration system may operate as a shared resource for each print device and the application computing device.

In an embodiment, a method of providing a software update to one or more remote print devices may include receiving, by a cloud administration system, a software update from an application computing device. The software update may include a software version. The method may include storing, by the cloud administration system, the software update, and transmitting the software update to one or more print devices located remotely from the cloud administration system.

In an embodiment, a method of updating software on a print device via a remote cloud administration system may include receiving, by a print device, a software update from a remote cloud administration system. The software update may include an indication of one or more print services capable of being performed by the print device that are affected by the software update. The method may include determining whether the software update can be performed while the print device is operating, in response to determining that the software update cannot be performed while the print device is operating, receiving, by the print device, an indication to suspend operation of at least one of the one or more print services, and installing, by the print device, the software update.

DETAILED DESCRIPTION

Figure 1A:
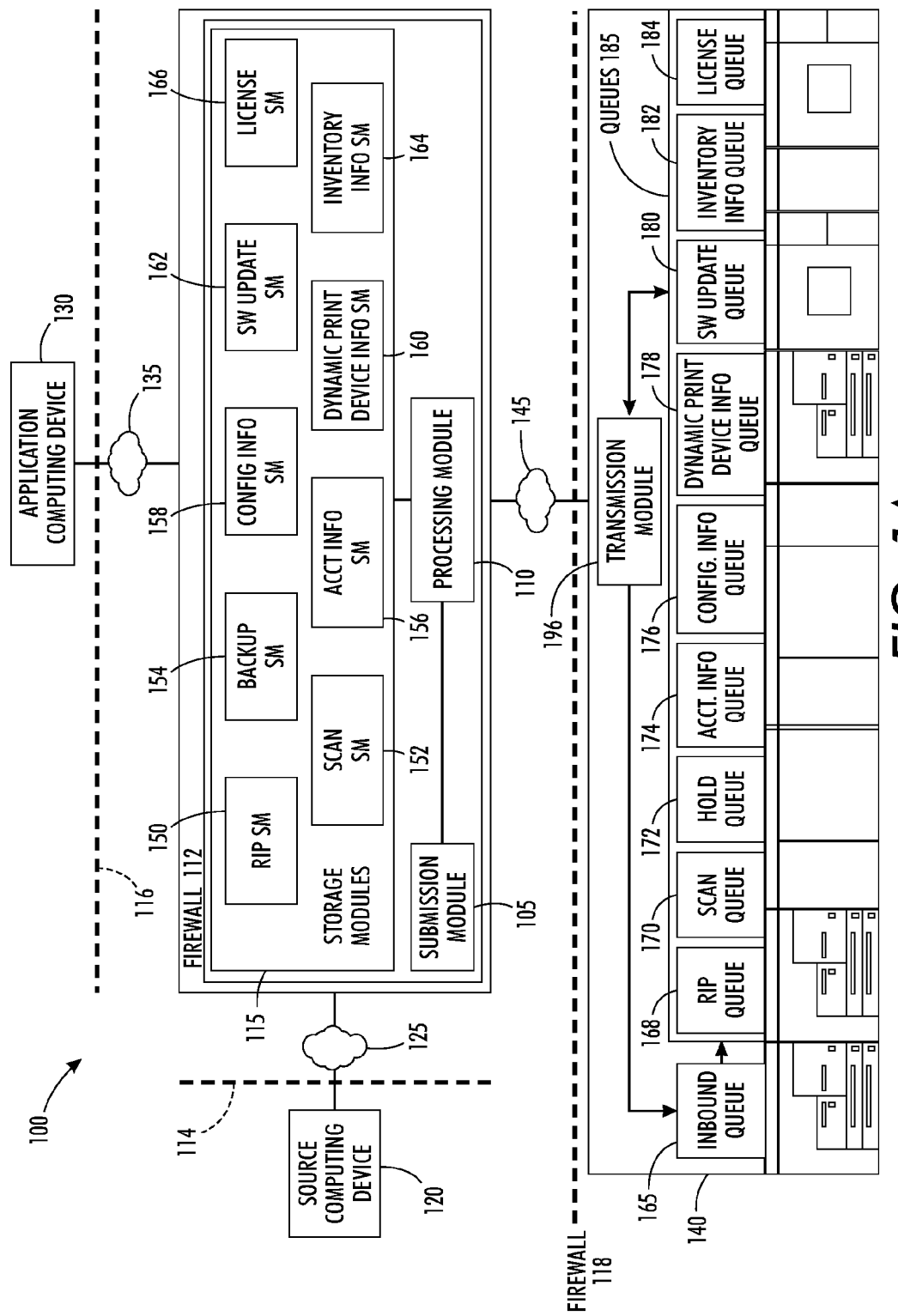
FIGS. 1A and 1B depicts a block diagram of an exemplary cloud administration system according to an embodiment.

The following terms shall have, for the purposes of this application, the respective meanings set forth below.

An "application computing device" is a computing device capable of sending information to and/or receiving information from a cloud administration system.

A "batch process" is a software update that is transmitted to a plurality of print devices.

A "cloud administration system" refers to one or more physical and/or logical devices that operate as a shared resource for multiple remote print devices and/or computing devices. Logical devices in a cloud administration system may be accessed without any knowledge of the corresponding physical devices.

A "computing device" or a "processor" refers to a computer or other machine that performs one or more operations according to one or more programming instructions. Exemplary computing devices may include personal computers, servers, mobile communication devices and/or the like. An exemplary computing device or processor is described in reference to FIG. 6.

A "critical update" is software that is released to fix a critical problem.

A "firewall" is hardware and/or software used to protect a resource of a network from unauthorized external access.

A "job" refers to a logical unit of work that is to be completed for a customer.

A "logical device" is a representation of a physical device that uniquely identifies the corresponding physical device. For example, a network interface may be assigned a unique media access control address that is the logical unique identifier of a physical device. As such, a conventional device is a combined logical and physical device in which the logical device provides the entire identity of the physical device.

A "module" is a component of a larger system, such as a cloud administration system.

An "operation" or a "print-related function" is a function that is performed on a print job. Exemplary operations may include raster image processing, formatting, stapling, collating, sorting, punching, binding and/or the like.

A "physical device" is a physical resource such as a computing device, a computer-readable storage medium and/or the like.

A "print job" refers to a job that can be processed by a print device. For example, a print job may include a job that is to be printed, scanned or otherwise processed by a print device.

A "print device" refers to a device capable of performing one or more print-related functions. For example, a print device may include a printer, a scanner, a copy machine, a multifunction device, a collator, a binder, a cutter or other similar equipment. A "multifunction device" is a device that is capable of performing two or more distinct print-related functions. For example, a multifunction device may have print and scan capabilities.

"Print device information" means accounting information, configuration information and/or dynamic print device information associated with a print device.

A "print-related function" is a function performed by a print device on a print job. Exemplary print-related functions may include stapling, collating, sorting, punching, binding and/or the like.

A "queue" is a data structure stored on a computer-readable medium and configured to temporarily store information, including, but not limited to, a print job, print device information, a software update and/or the like.

The term "remote," as used herein with respect to computing devices and/or print devices, refers to devices that operate on different computer networks and/or computer networks operated by different entities. For example, a computing device is remote from a print device if the computing device is connected to a first LAN operated by a first entity and the print device is connected to a second LAN operated by a second entity.

A "resource" is a physical device comprising a processor and/or a storage medium. Exemplary resources may include a computing device, a processing device, a storage device and/or the like.

A "shared resource" is a resource that may be accessed and used by a plurality of other resources.

A "software update" is software that modifies, supplements or replaces a software product, file and/or the like that has been previously released. Examples of software updates include a rollup, a service pack, a feature pack, a critical update, a security update, an upgrade, a hotfix and/or any other downloadable or uploadable software.

A "source computing device" is a computing device that is capable of transmitting one or more print jobs to a cloud administration system.

A "storage module" or "SM" is a computer-readable storage medium or portion thereof.

"Virtualization" is a configuration that allows logical devices to exist as an abstraction without being directly tied to a specific physical device. Virtualization may be achieved using logical names instead of physical identifiers. For example, using a uniform resource locator instead of a server's media access control address effectively virtualizes the target server. Alternatively, an assigned media access control address may exist independently of the physical resources managing network traffic.

FIG. 1A illustrates an exemplary cloud administration system according to an embodiment. As illustrated by FIG. 1A, a cloud administration system 100 may include a submission module 105, a processing module 110 and one or more storage modules 115. The submission module 105 and/or one or more of the storage modules 115 may be in communication with the processing module 110. In an embodiment, all communication to or from the cloud administration system 100 may be through a firewall 112.

In an embodiment, a storage module 115 may correspond to an operation or type of operation to be performed on a print job, or it may correspond to the type of information it stores. For example, as illustrated by FIG. 1A, the storage modules 115 may include a raster image processing (RIP) storage module 150, a scan storage module 152, a backup storage module 154, an accounting information storage module 156, a configuration information storage module 158, a dynamic print device information storage module 160, a software update storage module 162, an inventory information storage module 164, a license storage module 166 and/or the like. Storage modules 115 are discussed in more detail below.

In an embodiment, a cloud administration system 100 may be in communication with one or more source computing devices 120. A source computing device 120 may be located remotely from the cloud administration system 100. In an embodiment, all source computing devices 120 may be located remotely from the cloud administration system 100. In an embodiment, a source computing device 120 may communicate with a cloud administration system 100 through a plurality of firewalls. For example, a communication from a source computing device 120 to a submission module 105 may pass through a firewall 114 associated with the source computing device and the firewall 112 associated with the cloud administration system 100.

In an embodiment, a source computing device 120 may communicate directly with a cloud administration system 100 over a network 125. In an embodiment, the network 125 may be operated by an entity. An entity may be a corporation, an organization, a group, an individual and/or the like. In an embodiment, a plurality of source computing devices 120 may communicate with the cloud administration system 100 over one or more networks.

In an embodiment, a cloud administration system 100 may be in communication with one or more application computing devices 130. An application computing device 130 may be in communication with the processing module 110 and/or one or more storage modules 115. In an embodiment, an application computing device 130 may communicate with the cloud administration system 100 through a plurality of firewalls. For example, a communication from an application computing device 130 to a processing module 110 may pass through a firewall 116 associated with the application computing device and the firewall 112 associated with the cloud administration system 100.

In an embodiment, an application computing device 130 may be located remotely from the cloud administration system 100. In an embodiment, each application computing device 130 may be located remotely from the cloud administration system 100. In an alternate embodiment, an application computing device 130 may be a component of the cloud administration system 100.

An application computing device 130 may communicate with the cloud administration system 100 over a network 135. In an embodiment, an application computing device 130 may communicate directly with a submission module 105 over a network 135. In an embodiment, an application computing device 130 may communicate with a submission module 105 through one or more firewalls.

An application computing device 130 may be located remotely from a source computing device 120. In an embodiment, each application computing device 130 may be located remotely from each source computing device 120. In an embodiment, the network 135 over which an application computing device 130 may communicate with a cloud administration system 100 may be operated by a different entity than that which operates a network over which a source computing device 120 may communicate with the cloud administration system.

In an embodiment, a cloud administration system 100 may be in communication with one or more print devices 140. A print device 140 may be located remotely from the cloud administration system 100 and may communicate with the cloud administration system over one or more networks 145. In an embodiment, each print device 140 may be located remotely from the cloud administration system 100.

In an embodiment, a print device 140 may communicate with a cloud administration system 100 through a plurality of firewalls. For example, a communication from a print device 140 to a cloud administration system 100 may pass through a firewall 118 associated with the print device and the firewall 112 associated with the cloud administration system 100.

In an embodiment, a print device 140 may be located remotely from a source computing device 120 and an application computing device 130. In an embodiment, each print device 140 may be located remotely from each source computing device 120 and each application computing device 130. In an embodiment, the network 145 over which a print device 140 may communicate with a cloud administration system 100 may be operated by an entity that is different that that which operates a network over which a source computing device 120 may communicate with the cloud administration system and/or a network over which an application computing device 130 may communicate with the cloud administration system.

In an embodiment, a print device 140 may have one or more queues 185 that may be inbound and/or outbound queues. Although inbound and outbound queues are discussed as being separate queues, it is understood that an inbound queue may perform inbound and outbound queue functions, and that an outbound queue may perform outbound and inbound functions.

In an embodiment, a print device 140 may have an inbound queue 165, such as a spooler and/or the like. An inbound spooler may be a queue that receives, stores, schedules and/or requests printing of a print job. In an embodiment, a print device 140 may have one or more outbound queues 185. An outbound queue may store print jobs and/or print device information until the print device transmits these print jobs and/or print device information. For example, as illustrated by FIG. 1A, a print device may have a RIP queue 168, a scan queue 170, a hold queue 172, an accounting information queue 174, a configuration information queue 176, a dynamic print device information queue 178, a software update queue 180, an inventory information queue 182, a license queue 184 and/or the like. Queues 185 are discussed in more detail below.

In an embodiment, a print device 140 may have a transmission module 196. A transmission module may be in communication with one or more queues 185. A transmission module 196 may be configured to transmit data from a print device 140 to a computing device, another print device and/or the like. In an embodiment, a transmission module 196 may be in communication with a cloud administration system 100. For example, a transmission module 196 may be in communication with a processing module 110 of a cloud administration system 100.

In an embodiment, a source computing device 120, an application computing device 130 and a print device 140 may not communicate directly with one another. As illustrated by FIG. 1A, the source computing device 120, the application computing device 130 and the print device 140 may communicate indirectly via a cloud administration system 100.

Figure 1B:
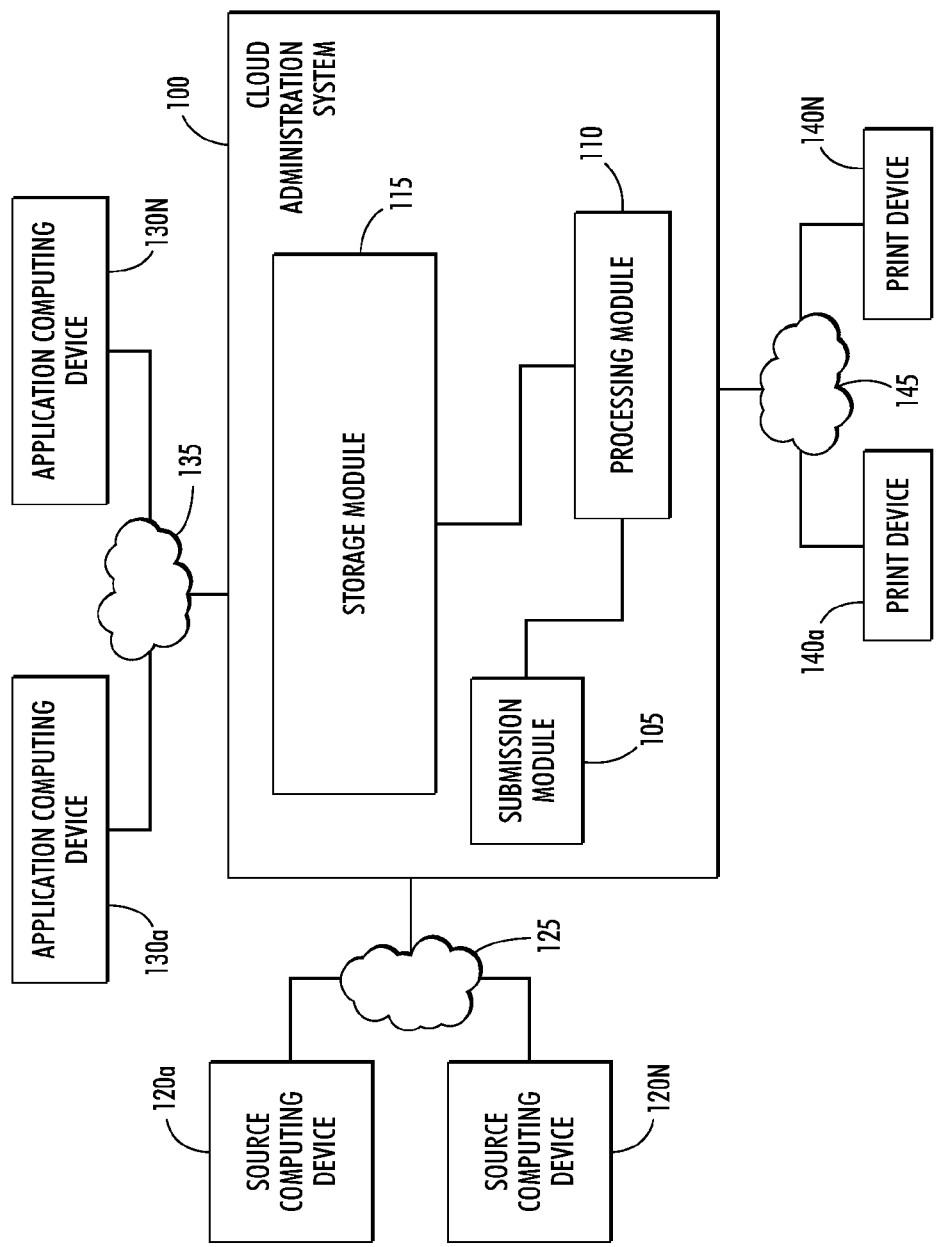

FIG. 1B depicts an exemplary cloud administration system according to an embodiment. As illustrated by FIG. 1B, a cloud administration system 100 may communicate with more than one source computing device 120a-N, application computing device 130a-N and/or print device 140a-N.

Figure 2:
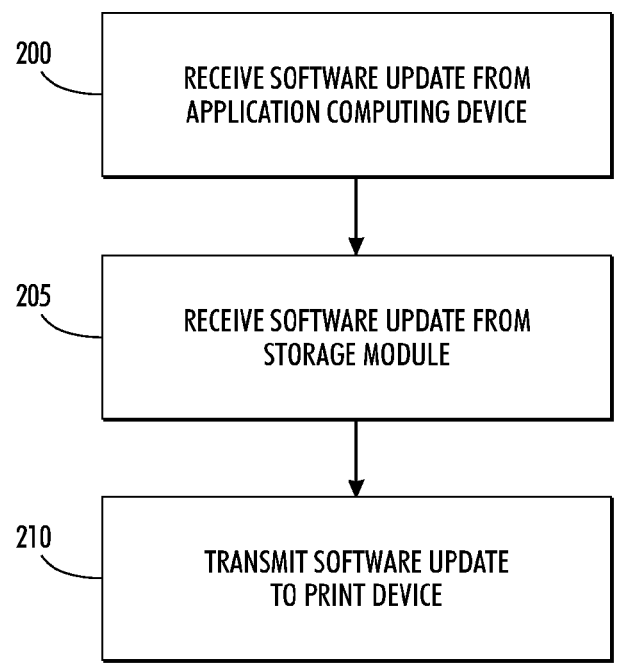
FIG. 2 depicts a flow diagram for an exemplary method of providing a software update to one or more remote print devices according to an embodiment.

FIG. 2 depicts a flow diagram for an exemplary method of providing a software update to one or more remote print devices according to an embodiment. As shown in FIG. 2, a software update may be received 200 by a storage module of a cloud administration system. In an embodiment, a software update may be received 200 by a storage module dedicated to receiving software updates. For example, a software update may be received by a software update storage module, such as the software update storage module 162 illustrated in FIG. 1A. The software update may include an identification of the version of the software. The software version may be used to identify, among other things, whether a particular software update is more or less recently developed than another software update.

In an embodiment, a software update may be received 200 from an application computing device. In an embodiment, an application computing device may be remotely located from the storage module and/or the cloud administration system. The software update may be received 200 through a hypertext transfer protocol (HTTP) request, a file transfer protocol (FTP) transmission, an email and/or the like. In an embodiment, the network over which the application computing device and the cloud administration system communicate may include a LAN, a WAN, a wireless network, the Internet, an intranet and/or the like.

A processing module of the cloud administration system may receive 205 the software update from the storage module. In an embodiment, the processing module may receive 205 the software update as a result of the storage module transmitting the software update to the processing module. In an alternate embodiment, the processing module may receive 205 the software update from the storage module by retrieving the software update from the storage module.

In an embodiment, the processing module may transmit 210 a software update to one or more print devices. In an embodiment, the processing module may transmit 210 a software update in response to receiving a software download request from a remote print device. In such an embodiment, the processing module may transmit 210 the software update to the remote print device from which the software download request is received.

In an embodiment, the processing module may receive a software download request, including a software version, from a remote print device. The processing module may determine whether the software version of the software update stored in the storage module differs from the software version received from the remote print device. If so, the processing module may transmit 210 the software update to the remote print device.

In an embodiment, the processing module may transmit 210 a software update to each of one or more print devices as a batch process. For example, the processing module may transmit 210 the software update to each print device of a particular print device model as a batch process. As another example, the processing module may transmit 210 the software update as a batch process to each print device associated with a certain user. In an alternate embodiment, the processing module may transmit 210 the software update to each print device in communication with the processing module as a batch process.

In an embodiment, the processing module may be further configured to determine whether the software update comprises a critical update. In an embodiment, a critical update may resolve a known error in previously installed software, add required functionality to the software, and/or the like. If the software update comprises a critical update, the processing module may transmit an update request to one or more remote print devices. An update request may include one or more instructions that notify a print device of the existence of a software update.

In an embodiment, in response to transmitting an update request, the processing module may receive an update response from at least one remote print device. The update response may include one of an approval of the update request or a denial of the update request. If the update response includes an approval of the update request, the processing module may transmit 210 the critical update to the remote print device from which the update response including an approval of the update request is received. In an embodiment, if the update response includes a denial of the update request, the processing module may not transmit the critical update to the remote print device from which the update response including a denial of the update response is received.

Figure 3:
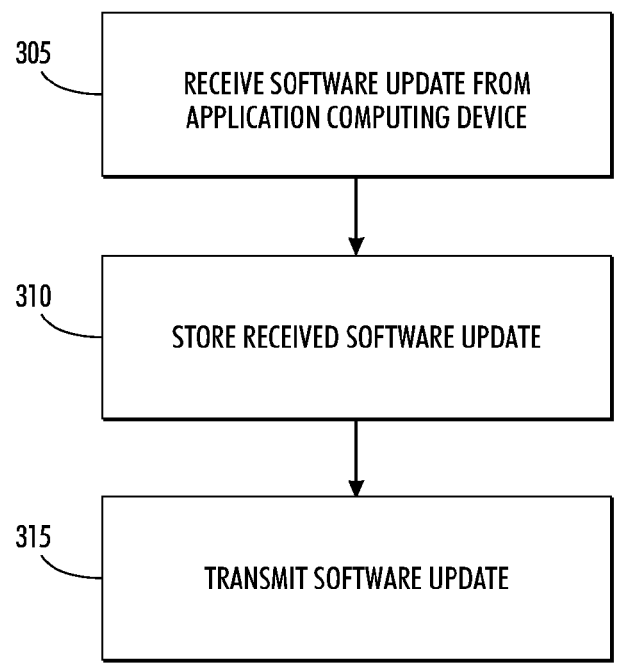
FIG. 3 depicts a flow diagram for an alternate exemplary method of providing a software update to one or more remote print devices according to an embodiment.

FIG. 3 depicts a flow diagram of an alternate exemplary method of providing a software update to one or more remote printing devices according to an embodiment. As shown in FIG. 3, a cloud administration system may receive 305 a software update from an application computing device. The software update may comprise a software version, which may be used to identify, among other things, whether the software update is more or less recently developed than another software update.

The cloud administration system may store 310 the received software update and may transmit 315 the software update to one or more remote print devices. In an embodiment, the cloud administration system may receive a software download request from a remote print device and transmit 315 the software update to the remote print device in response to the software download request.

In an alternate embodiment, the cloud administration system may receive a software download request that includes a software version from a remote print device. The software version may represent a version of the software that is installed on the remote print device. The cloud administration system may determine whether the software version of the software update stored in the cloud administration system differs from the software version for the remote print device. If so, the cloud administration system may transmit 315 the software update to the remote print device.

In an embodiment, the cloud administration system may transmit 315 the software update to a plurality of remote print devices as a batch process. For example, the cloud administration system may transmit 315 the software update to all remote print devices of a particular model and/or at a particular location.

In an embodiment, the cloud administration system may further determine whether the software update comprises a critical update. If the software update is determined to be a critical update, the cloud administration system may transmit an update request to the one or more remote print devices. The cloud administration system may receive an update response from a remote print device that includes one of an approval of the update request or a denial of the update request. If the update response comprises an approval of the update request, the cloud administration system may transmit 315 the software update to the remote print device from which the update response was received.

Figure 4A:
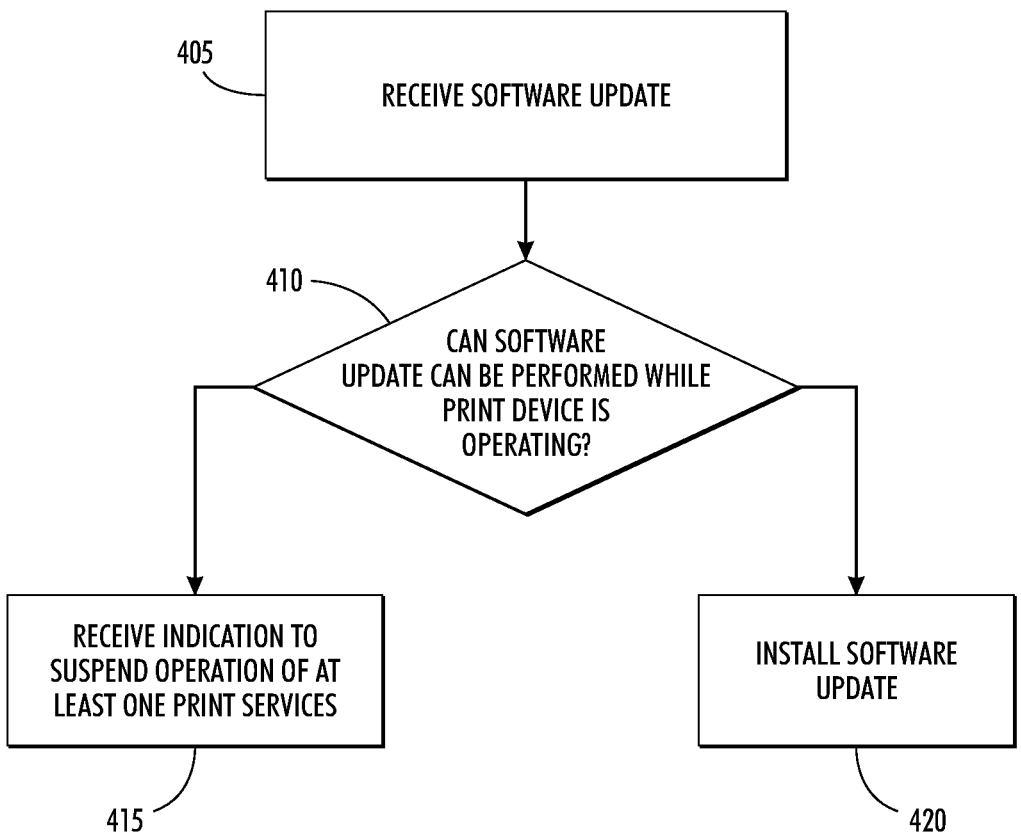
FIGS. 4A-4C depicts a flow diagram for an exemplary method of updating software on a print device via a remote cloud administration system according to an embodiment.

FIG. 4A depicts a flow diagram of an exemplary method of updating software on a print device via a remote cloud administration system according to an embodiment. As shown in FIG. 4A, a print device may receive 405 a software update from a remote cloud administration system. The software update may include an indication of one or more print services capable of being performed by the print device that are affected by the software update. For example, the software update may include an indication pertaining to color printing, stapling, collating and/or the like.

A determination may be made 410 as to whether the software update can be performed while the print device is operating. In an embodiment, the determination may be made 410 by the cloud administration system. Alternately, the determination may be made 410 by the print device or a computing device in communication with the print device.

If it is determined that the software update cannot be performed while the print device is operating, the print device may receive 415 an indication to suspend operation of at least one of the one or more print services. In an embodiment, the at least one print service for which operation is suspended may correspond to a print service indicated in the software update that is present on the print device. The print device may then install 420 the software update. Alternately, if it is determined that the software update can be performed while the print device is operating, the print device may install 420 the software update.

Figure 4B:
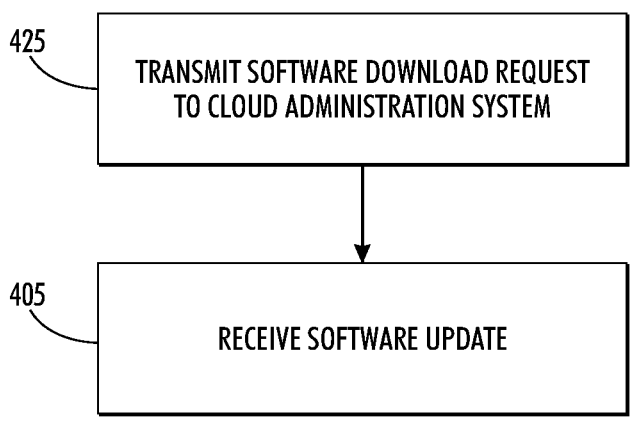

FIG. 4B illustrates a flow diagram of an exemplary method of updating software on a print device via a remote cloud administration system according to an embodiment. As shown in FIG. 4B, a software download request may be transmitted 425 to a remote cloud administration system prior to receiving 405 the software update. In such an embodiment, the print device may then receive 405 the software update from the remote cloud administration system in response to transmitting 425 a software download request.

Figure 4C:
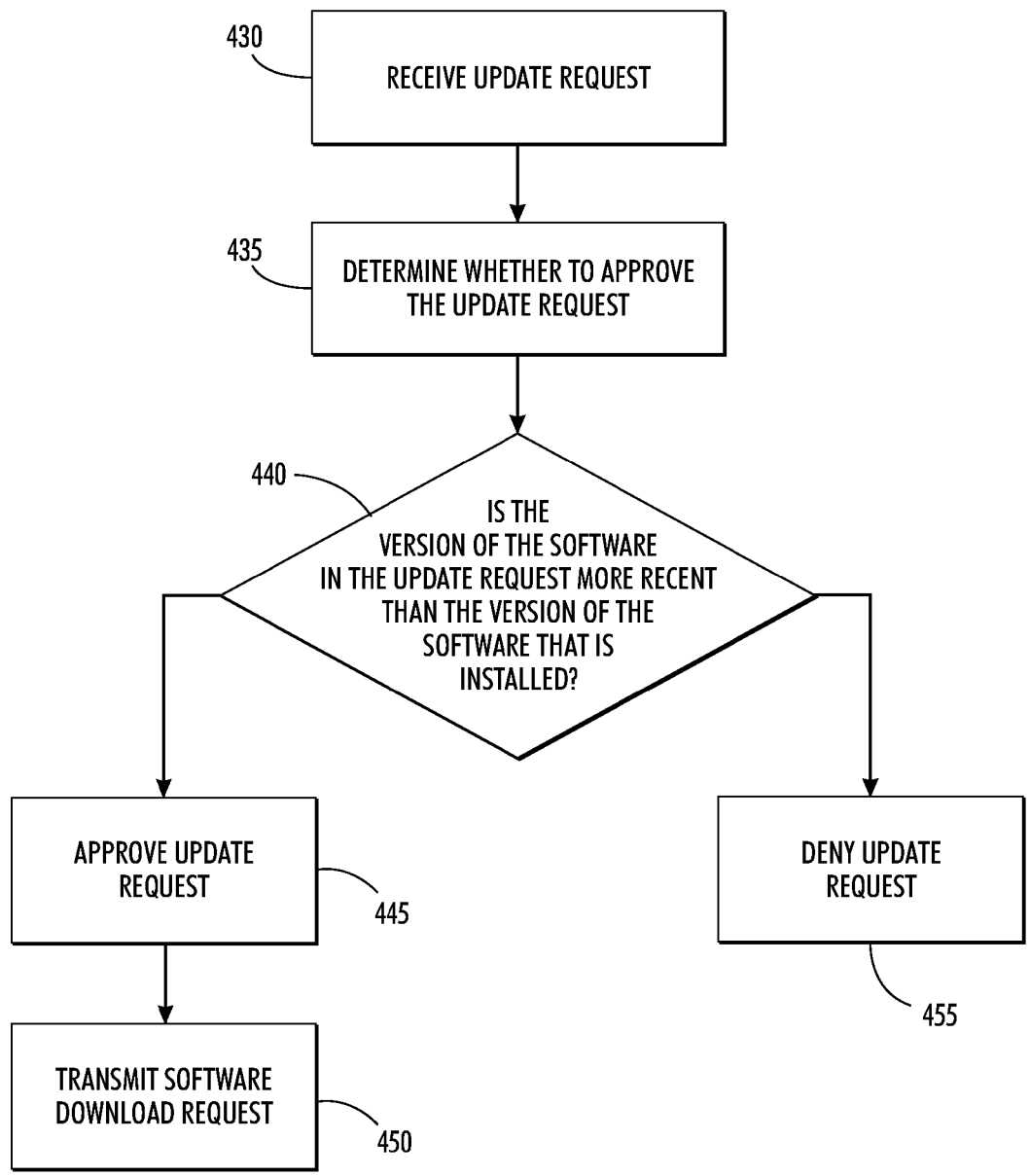

FIG. 4C illustrates a flow diagram of an exemplary method of updating software on a print device via a remote cloud administration system according to an embodiment. As illustrated by FIG. 4C, a print device may receive 430 an update request pertaining to the software update from the remote cloud administration system. The print device may determine 435 whether to approve the update request. Determining 435 whether to approve the update request may comprise comparing 440 a software version of the software installed on the print device with a software version included as part of the update request. If the software version included as part of the update request is more recent (i.e., has a higher version number) than the installed software version, then the print device may approve 445 the update request. In response to approving the update request, the print device may transmit 450 a software download request to a remote cloud administration system. In an embodiment, if the software version included as part of the update request is the same or less recent (i.e., has a lower version number) than the installed software version, the print device may deny 455 the update request.

Figure 5:
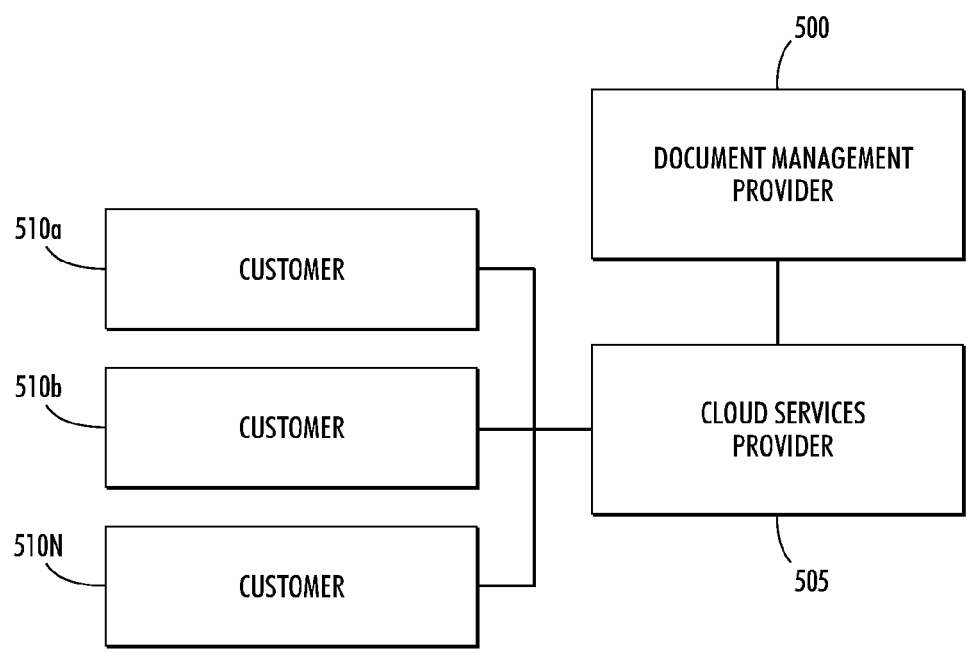
FIG. 5 illustrates an exemplary implementation of a cloud administration system according to an embodiment.

FIG. 5 illustrates an exemplary implementation of a cloud administration system according to an embodiment. A document management provider 500 may contract with a cloud services provider 505 to provide cloud services to the document management provider's customers 510*a*-N. A document management provider 500 may be an entity that supplies, manages and/or maintains print devices, processes print jobs and/or performs other document management services. A cloud services provider 505 may operate and/or maintain a cloud administration system to provide cloud services. Cloud services may include applications that are accessed remotely on demand from a cloud services provider that hosts the applications. Cloud services may include applications for document management, document processing, account management, print device configuration, document retention and backup, and/or the like.

In an embodiment, a computing device operated by document management provider 500 may communicate directly with a cloud administration system. For example, a print device utilized by a document management provider 500 may send a software update to a cloud administration system operated by a cloud services provider 505. The cloud administration system may store the software update. In an embodiment, the cloud administration system may distribute the software update to one or more print devices operated by one or more customers 510*a*-N.

Figure 6:
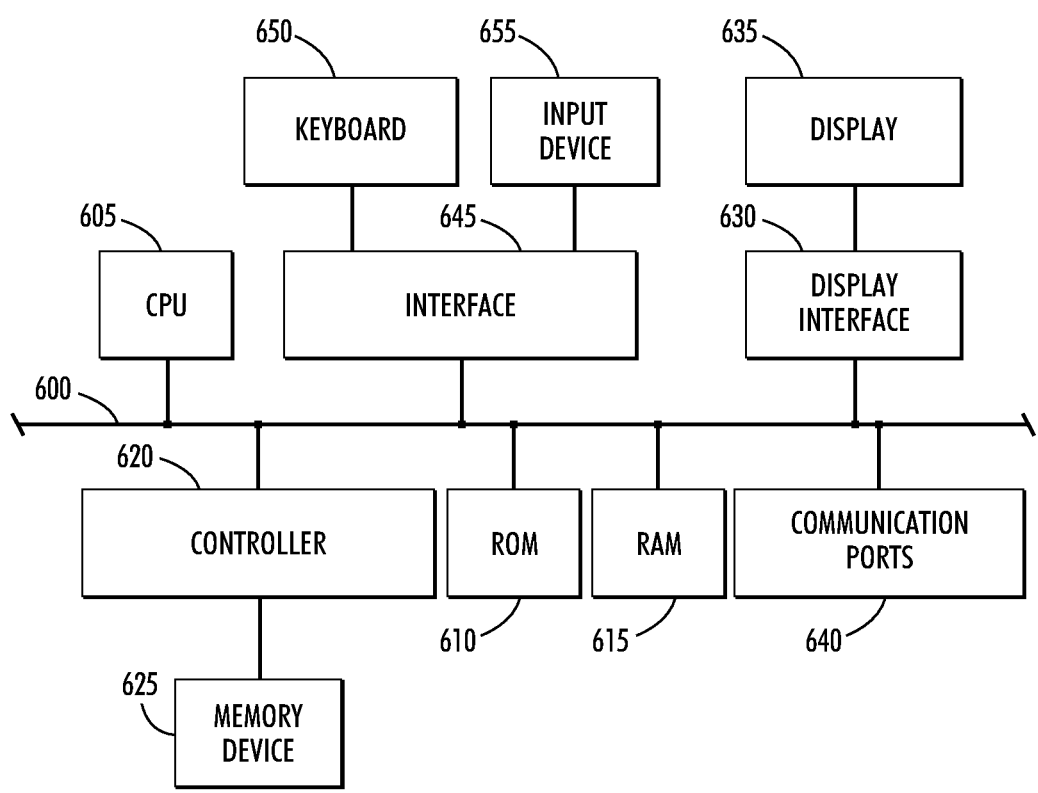
FIG. 6 depicts a block diagram of exemplary internal hardware that may be used to contain or implement program instructions according to an embodiment.

FIG. 6 depicts a block diagram of exemplary internal hardware that may be used to contain or implement program instructions, such as the process steps discussed above in reference to FIGS. 2-4, according to embodiments. A bus 600 serves as the main information highway interconnecting the other illustrated components of the hardware. CPU 605 is the central processing unit of the system, performing calculations and logic operations required to execute a program. CPU 605, alone or in conjunction with one or more of the other elements disclosed in FIG. 6, is an exemplary processing device, computing device or processor as such terms are used within this disclosure. Read only memory (ROM) 610 and random access memory (RAM) 615 constitute exemplary memory devices.

A controller 620 interfaces with one or more optional memory devices 625 to the system bus 600. These memory devices 625 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 630 may permit information from the bus 600 to be displayed on the display 635 in audio, visual, graphic or alphanumeric format. Communication with external devices, such as a print device, may occur using various communication ports 640. An exemplary communication port 640 may be attached to a communications network, such as the Internet or an intranet.

The hardware may also include an interface 645 which allows for receipt of data from input devices such as a keyboard 650 or other input device 655 such as a mouse, a joystick, a touch screen, a remote control, a pointing device, a video input device and/or an audio input device.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A cloud administration system for providing a software update to one or more remote print devices, the system comprising:
   one or more computing devices comprising:
      one or more processors;
      a processing module in communication with a submission module of each of a plurality of print devices, wherein the processing module is located remotely from each print device; and
      a storage module in communication with the processing module,
   wherein the storage module is configured to receive a software update from an application computing device,
   wherein the software update comprises:
      a software version, and
      an indication of one or more affected print services, wherein the affected print services comprise one or more print services that are capable of being performed by at least one of the print devices and that are affected by the software update,
   wherein the processing module is configured to:
      receive the software update from the storage module,
      receive a software download request from one of the plurality of print devices, wherein the software download request comprises a software version for the print device,
      determine whether the software version of the software update differs from the software version for the print device, and
      in response to determining that the software version of the software update differs from the software version for the print device:
         determine whether the software update can be performed while the print device is operating, and
         in response to determining that the software update cannot be performed while the print device is operating, transmit to the print device the software update and an indication to suspend one or more of the affected print services while the print device installs the software update,
   wherein the cloud administration system operates as a shared resource for each print device and the application computing device.

2. The system of claim 1 wherein the processing module being configured to transmit the software update comprises the processing module being configured to transmit the software update to each of the plurality of print devices as a batch process.

3. The system of claim 1 wherein the processing module is further configured to:
   determine whether the software update comprises a critical update;

in response to the software update comprising a critical update, transmit an update request to the plurality of print devices; and receive an update response from one or more of the plurality of print devices, wherein the update response comprises one of an approval and a denial, and wherein the processing module being configured to transmit the software update comprises the processing module being configured to transmit the software update to the remote print device in response to the update response comprising an approval.

4. A method of providing a software update to one or more remote print devices, the method comprising:

receiving, by a cloud administration system, a software update from an application computing device, wherein the software update comprises a software version and an indication of one or more affected print services, wherein the affected print services comprise one or more print services that are capable of being performed by at least one of the print devices and that are affected by the software update;

storing, by the cloud administration system, the software update;

receiving a software download request from one of the print devices, wherein the software download request comprises a software version for the print device, determine whether the software version of the software update differs from the software version for the print device, and in response to determining that the software version of the software update differs from the software version for the print device:

determine whether the software update can be performed while the print device is operating, and in response to determining that the software update cannot be performed while the print device is operating, transmit to the print device the software update and an indication to suspend one or more of the affected print services while the print device installs the software update, wherein the print device is located remotely from the cloud administration system.

5. The method of claim 4, wherein transmitting the software update to one or more remote print devices comprises transmitting the software update to each remote print device as a batch process.

6. The method of claim 4, further comprising:

determining whether the software update comprises a critical update;

in response to the software update comprising a critical update, transmitting an update request to the one or more remote print devices; and receiving an update response from a remote print device, wherein the update response comprises one of an approval and a denial, wherein transmitting the software update comprises transmitting the software update to the remote print device in response to the update response comprising an approval.

7. A method of updating software on a print device via a remote cloud administration system, the method comprising:

sending, by a print device, a software download request for a software update to a cloud administration system, wherein the software download request comprises a software version for the print device;

in response to the software version for the print device differing from a software version for the software update:

receiving, by the print device, the software update from a remote cloud administration system, wherein the software update comprises an indication of one or more affected print services, wherein the affected print services comprise one or more print services that are capable of being performed by the print device and that are affected by the software update, receiving an indication from the cloud administration system to suspend one or more of the affected print services while the print device installs the software update, and suspending, by the print device, operation of the one or more affected print services; and installing, by the print device, the software update.

8. The method of claim 7, further comprising:

receiving an update request pertaining to the software update from the remote cloud administration system;

determining whether to approve the update request; and in response to approving the update request, transmitting a software download request for the software update to the remote cloud administration system.

* * * * *